(12) United States Patent
Ma

(10) Patent No.: US 11,212,077 B2
(45) Date of Patent: Dec. 28, 2021

(54) AUTHENTICATION OF MESSAGES SENT ACROSS A NETWORK OF MULTIPLE DATA CENTERS

(71) Applicant: Cisco Technology, Inc., San Jose, CA (US)

(72) Inventor: Xueqiang Ma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 363 days.

(21) Appl. No.: 16/168,208

(22) Filed: Oct. 23, 2018

(65) Prior Publication Data

US 2020/0127814 A1    Apr. 23, 2020

(51) Int. Cl.
| | | |
|---|---|---|
| *G06F 21/60* | (2013.01) | |
| *H04L 9/06* | (2006.01) | |
| *G06F 16/27* | (2019.01) | |
| *G06F 16/22* | (2019.01) | |

(52) U.S. Cl.
CPC ........ *H04L 9/0643* (2013.01); *G06F 16/2246* (2019.01); *G06F 16/27* (2019.01); *H04L 9/0637* (2013.01); *G06F 21/602* (2013.01); *H04L 2209/38* (2013.01)

(58) Field of Classification Search
CPC ... H04L 9/0643; H04L 9/0637; H04L 9/3239; H04L 2209/38; H04L 63/1466; H04L 63/126; G06F 16/27; G06F 16/2246; G06F 16/9024; G06F 21/602; G06F 21/445; G06F 21/64
See application file for complete search history.

(56) References Cited

U.S. PATENT DOCUMENTS

| | | | |
|---|---|---|---|
| 2016/0283920 A1 | 9/2016 | Fisher et al. | |
| 2017/0033932 A1* | 2/2017 | Truu | ...................... H04L 9/3239 |
| 2018/0101701 A1* | 4/2018 | Barinov | ................... H04L 63/12 |
| 2018/0109516 A1* | 4/2018 | Song | ...................... H04L 9/3268 |
| 2018/0115428 A1* | 4/2018 | Lysenko | ............... H04L 9/0637 |
| 2018/0204191 A1* | 7/2018 | Wilson | ................... H04L 9/3242 |
| 2018/0219669 A1 | 8/2018 | Chen et al. | |
| 2018/0268401 A1 | 9/2018 | Ortiz et al. | |

OTHER PUBLICATIONS

Emanuel Ferreira Jesus, Vanessa R. L. Chicarino, Célio V. N. de Albuquerque, and Antônio A. de A. Rocha, "A Survey of How to Use Blockchain to Secure Internet of Things and the Stalker Attack," Institute of Computing (IC), Fluminense Federal University (UFF), Niteroi, RJ, Brazil, Received Oct. 27, 2017; Revised Dec. 29, 2017; Accepted Feb. 11, 2018; Published Apr. 8, 2018, 28 pages.

* cited by examiner

*Primary Examiner* — Khoi V Le
(74) *Attorney, Agent, or Firm* — Patterson + Sheridan, LLP

(57) ABSTRACT

The disclosure provides an approach for authenticating the contents of a control message sent between data centers. The data centers are located in a computing system comprising multiple data centers. The computing system has a controller, and each data center has a local controller. The message contents comprise a tree of data objects. The tree is converted to a hash tree, and the root hash of the hash tree is stored on a distributed blockchain. Storage on the distributed blockchain ensures that the root hash is not tampered with by an attacker. The receiver of the message then authenticates that the hash tree has not been modified by comparing various hash values, as described herein.

18 Claims, 6 Drawing Sheets

AUTHENTICATION OF MESSAGES SENT ACROSS A NETWORK OF MULTIPLE DATA CENTERS

TECHNICAL FIELD

Embodiments presented in this disclosure generally relate to authenticating messages sent across a network. More specifically, embodiments disclosed herein relate to authenticating messages containing a hash tree, the authentication being performed by referencing a hash stored within a distributed blockchain data structure.

BACKGROUND

Sending a message between data centers sometimes involves sending the message along a public network. When a message is on the public network, the message is vulnerable to attack by a malicious entity. The attack may be, for example, a man-in-the-middle attack. In a man-in-the-middle-attack, a malicious entity intercepts messages between two parties, modifies the messages, and then forwards the messages along to the originally intended recipient. Modifications of messages by the malicious entity may go unnoticed by the communicating parties, and information other than that intended may be exchanged by the parties. Malicious entities are able to conduct man-in-the-middle attacks by circumventing mutual authentication techniques. A need exists for improved authentication techniques to authenticate messages sent over a network vulnerable to attack by malicious entities.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method of authenticating a message, the method comprising, obtaining a set of data objects, the data objects being organized in a first management object (MO) tree, wherein the first MO tree is a tree data structure, converting the first MO tree to an extended MO tree, the extended MO tree comprising a root hash of a root node of the extended MO tree. The method further comprises adding the root hash to a distributed blockchain, transmitting the extended MO tree across a network to a destination data center, and authenticating the extended MO tree at the destination data center by comparing (a) the root hash contained within the distributed blockchain, and (b) a second hash.

Further embodiments include a non-transitory computer-readable storage medium storing instructions that, when executed by a computer system, cause the computer system to perform the method set forth above, and a computer system programmed to carry out the method set forth above.

EXAMPLE EMBODIMENTS

The present disclosure provides an approach for authenticating contents of a message, the contents including a tree of data objects. The tree is extended through addition of hashes to the tree. The root hash of the extended tree is stored on a distributed blockchain. Storage on the distributed blockchain ensures that the root hash is not tampered with by an attacker. The receiver of the message compares the root hash on the blockchain to the root hash of the received extended tree to authenticate that the extended tree has not been modified.

Figure 1:
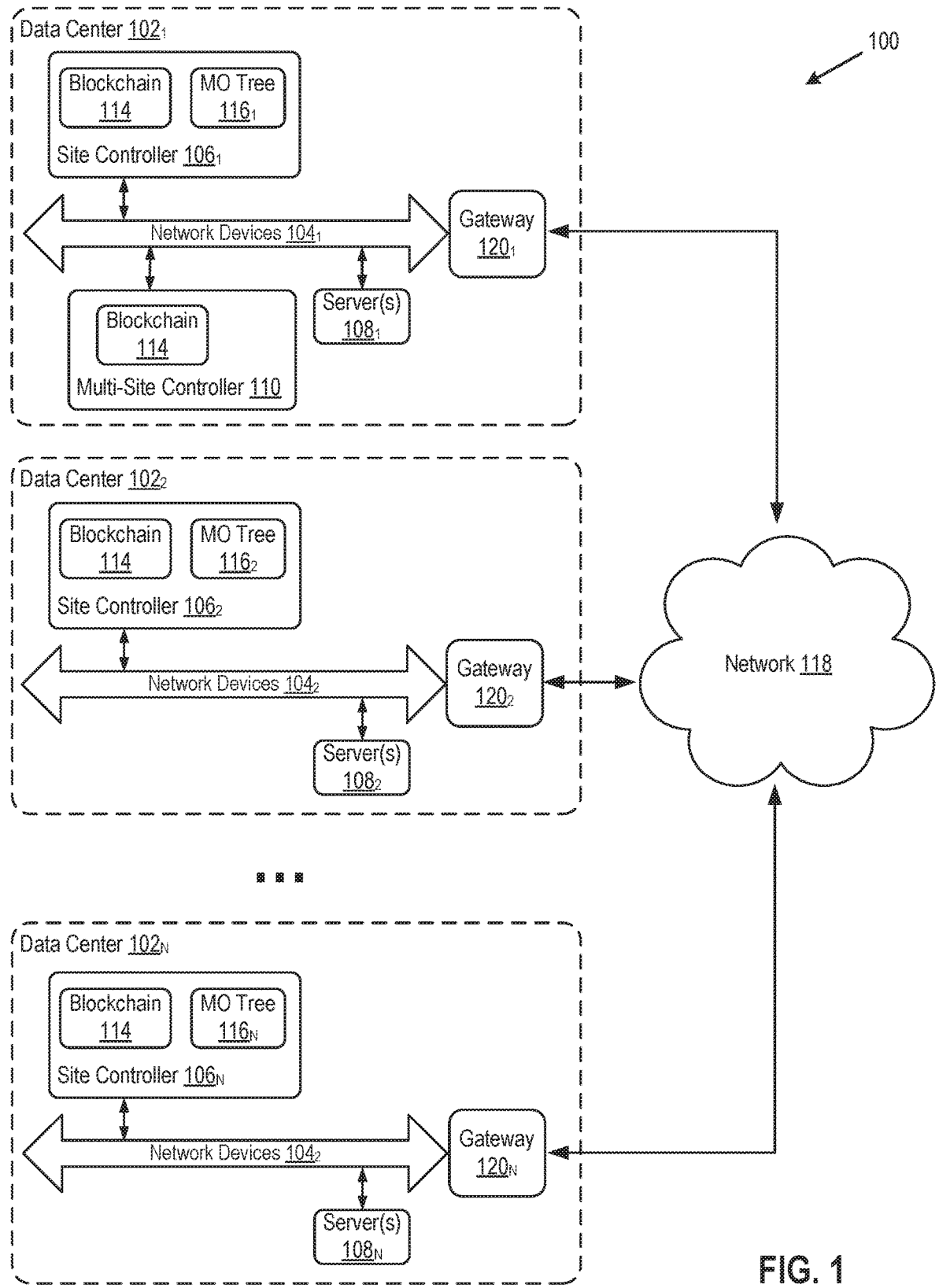
FIG. 1 depicts a block diagram of a computing system in which one or more embodiments of the present disclosure may be utilized.

FIG. 1 depicts a block diagram of a computing system 100 in which one or more embodiments of the present disclosure may be utilized. Computing system 100 includes data centers $102_1$-$102_N$ (collectively referred to as data centers 102 and individually referred to as data center 102) connected by a network 118. Network 118 may be, for example, a direct link, a LAN, a wide area network (WAN), another type of network, or a combination of these. Network 118 may be a public network, such as the Internet, or a private network. Network 118 might be vulnerable to attacks by a malicious entity, and therefore, users of network 118 may benefit from an authentication and validation process of messages sent across network 118, as described herein. An example of computing system 100 is the Application Centric Infrastructure (ACI) product available from Cisco Systems, Inc. of San Jose, Calif.

Computing system 100 also includes a multi-site controller 110 located within one of data centers 102, or distributed among one or more data centers 102 or outside the one or more data centers 102. Multi-site controller 110 is a management module for controlling and configuring site controllers 106. Multi-site controller 110 may act as a hub for messages passed between data centers 102 by site controllers 106. That is, when one site controller 106 sends a message to a second site controller 106, the first site controller 106 sends the message to multi-site controller 110, and multi-site controller 110 then forwards the message to the second site controller 106. Although multi-site controller 110 is shown as located within data center $102_1$, multi-site controller may be located in any data center 102, in multiple data-centers 102, or outside data centers 102. Multi-site controller 110 may be located in multiple data centers 102 if, for example, multi-site controller 110 is a distributed software service. Multi-site controller 110 has access to each management object (MO) tree 116 (see FIG. 2) of each data center 102. Multi-site controller 110 may serve as one of the storage locations for a distributed blockchain 114, as described below with reference to FIG. 3.

Each data center 102 includes a network comprising network devices 104, a site controller 106, one or more servers 108 (collectively referred to as servers 108 and individually referred to as server 108), and a gateway 120. Network devices 104 may be physical or virtual devices, and may be, for example, switches or switch-routers. In an embodiment, network devices 104 are organized in a fabric of spine and leaf switches or switch-routers, which communicatively connect the servers 108

In an embodiment, the server 108 is a physical machine comprising an operating system, central processing unit, memory, network interface card (NIC), and a storage. In another embodiment, server 108 is a virtual appliance, such as a virtual machine or a container, executing on a host machine comprising virtualization software, such as a hypervisor or a virtual machine monitor (VMM). In a third embodiment, servers 108 are a mix of physical machines and virtual appliances.

The gateway 120 provides an entry for network traffic into and out of data center 102. The gateway 120 may provide services such security and network address translation for data center 102. The gateway 120 may be a physical or a virtual appliance, or a software service running within server(s) 108.

The site controller 106 is a management module for controlling and configuring components within the data center 102 that contains the controller 106. As used herein, the term "site" is synonymous with "data center." The site controller 106 may be a physical or a virtual appliance (e.g., a software defined networking (SDC) controller), a software service running on one of servers 108, or a software service distributed throughout servers 108. The site controller 106 communicates with other site controllers 106 in other data centers 106.

The site controller 106 includes a copy of a distributed blockchain 114. The site controller 106 also includes a management object (MO) tree 116. Blockchain 114 and MO tree 116 are further described below with reference to FIG. 2 and FIG. 3. Prior to sending a message containing the MO tree 116 or a subtree of the MO tree 116, the site controller 106 converts the tree into an extended MO subtree for subsequent message authentication purposes, as described below with reference to FIG. 5.

Figure 2:
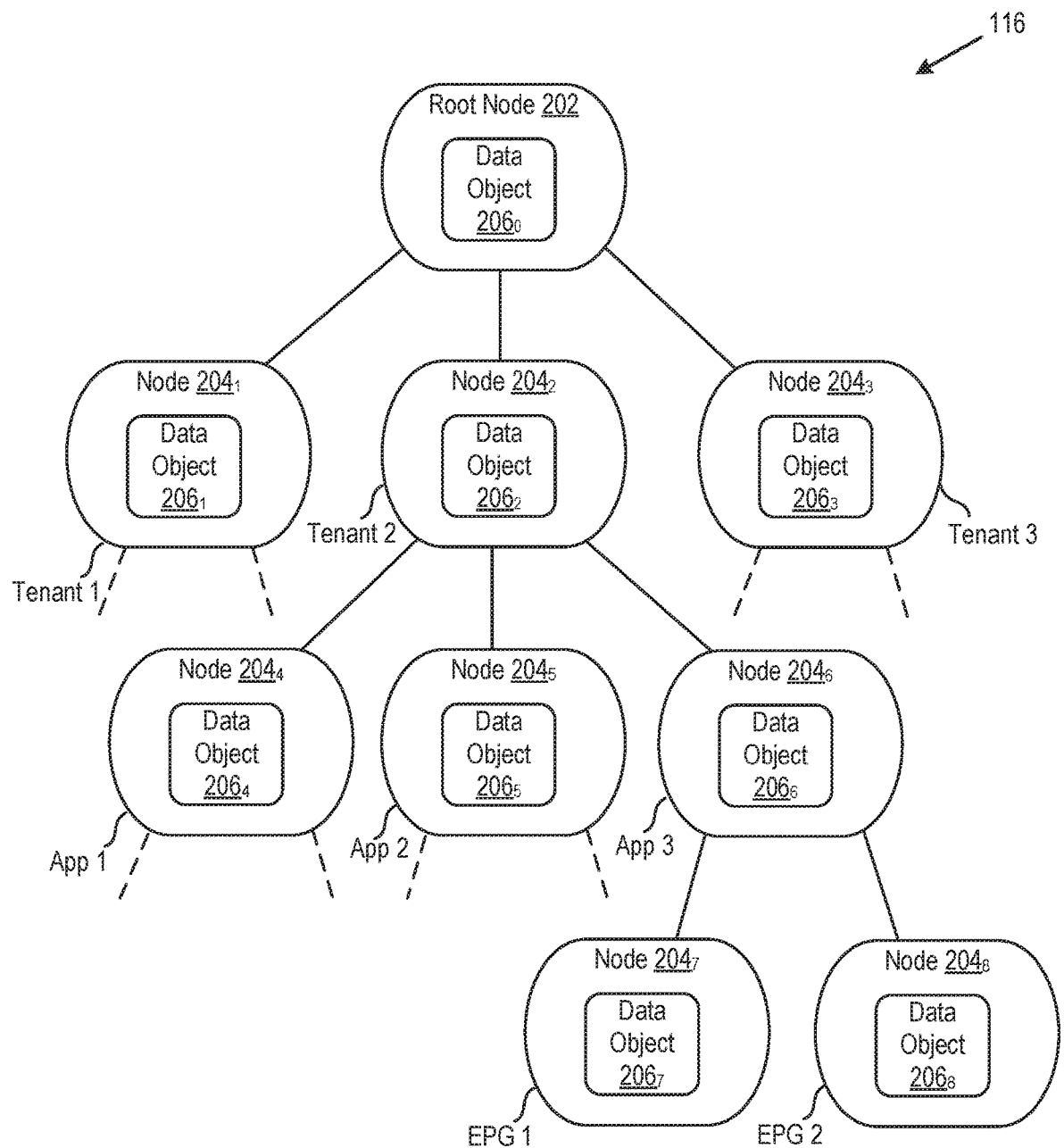
FIG. 2 depicts a block diagram of an exemplary management object tree, according to an embodiment.

FIG. 2 depicts a block diagram of an exemplary MO tree 116, according to an embodiment. MO tree 116 comprises a root node 202 and plurality of nodes 204. Nodes 204 are direct and indirect children of root node 202. As used herein, a "direct child" or a node located "directly" underneath another node 202/204 is a node that is connected to its parent without an intermediate node 204 between the parent node and child node. For example, node $204_1$ is a direct child of root node 202, and root node 202 is a direct parent of node $204_2$. An "indirect child" or node located "indirectly" underneath another node is a node 202/204 that is connected to its parent through at least one intermediate node. For example, node $204_7$ is an indirect child of node $204_2$, and node $204_2$ is an indirect parent of node $204_7$.

Each node 202/204 of MO tree 116 contains a data object 204 used by the site controller 106 to manage its data center 102, and to configure the network devices 104 within its data center 102. For example, each data center 102 may provide services to various tenants that use the data center 102. A tenant may be, for example, a company (e.g., corporation) or an individual client of computing system 100. In the exemplary MO tree 116 of FIG. 2, tenants are represented by nodes $204_1$, $204_2$, and $204_3$. The data objects 204 within nodes $204_1$, $204_2$, and $204_3$ may have tenant data, such as a tenant identifier, location, permissions, policies, etc. Although each tenant node $204_1$, $204_2$, and $204_3$ may have child nodes, for brevity, only the tenant node $204_2$ is shown as having child nodes. Each tenant may have access to one or more applications, which are represented by nodes $204_4$, $204_5$ and $204_6$. The data object $206_4$ may have data of an application, such as an application identifier and a storage location. An application may be, for example, a PDF reader or a document processing application.

Each application may be associated with one or more endpoint groups (EPGs), as shown by nodes $204_7$ and $204_8$. An EPG is a group of servers 108. And EPG provides a sub-service of the application. For example, an application may be split into a three-tiered application, with each tier corresponding to an EPG and providing the sub-service. The three-tiered application may comprise a web tier, an application tier, and a data tier. Data object $206_7$ may have data of servers 108 within a first EPG, the data including for example, identifiers of servers 108. Although each application node $204_4$, $204_5$ and $204_6$ may have child nodes 204, for brevity, only application node $204_6$ is shown as having child nodes. In an embodiment, each MO tree 116 at each data center 102 is unique, representing the unique combination of data objects 204 used for management and configuration of the data center 102.

Each site controller 106 may share its MO tree 116 or a subtree of its MO tree 116 with another controller 106. For example, a first tenant might use data center $102_1$ and a second tenant might use data center $102_2$. The MO tree $116_1$ has a data object containing data of the first tenant, and MO tree $116_2$ has a data object containing data of the second tenant. If it became desirable or necessary for data center $102_1$ or both data centers $102_1$ and $102_2$ to service the second tenant, then site controller $106_2$ can send its MO tree $116_2$ or a subtree of its MO tree $116_2$ to site controller $106_1$. This subtree contains data of the second tenant. For example, if FIG. 2 depicts MO tree $116_2$, and it became desirable for tenant 2 (represented by node $204_2$) to be serviced at data center $102_1$, then site controller $106_2$ sends a subtree of MO tree $116_2$ to controller $106_1$. In this example, the subtree comprises node $204_2$ and all its child nodes. That is, the subtree comprises nodes $204_2$, $204_4$, $204_5$, $204_6$, $204_7$ and $204_8$. As described below with reference to FIG. 5 and FIG. 6, before transmitting the subtree, site controller $106_2$ converts the subtree into an extended MO tree, for subsequent authentication of message contents.

Figure 3:
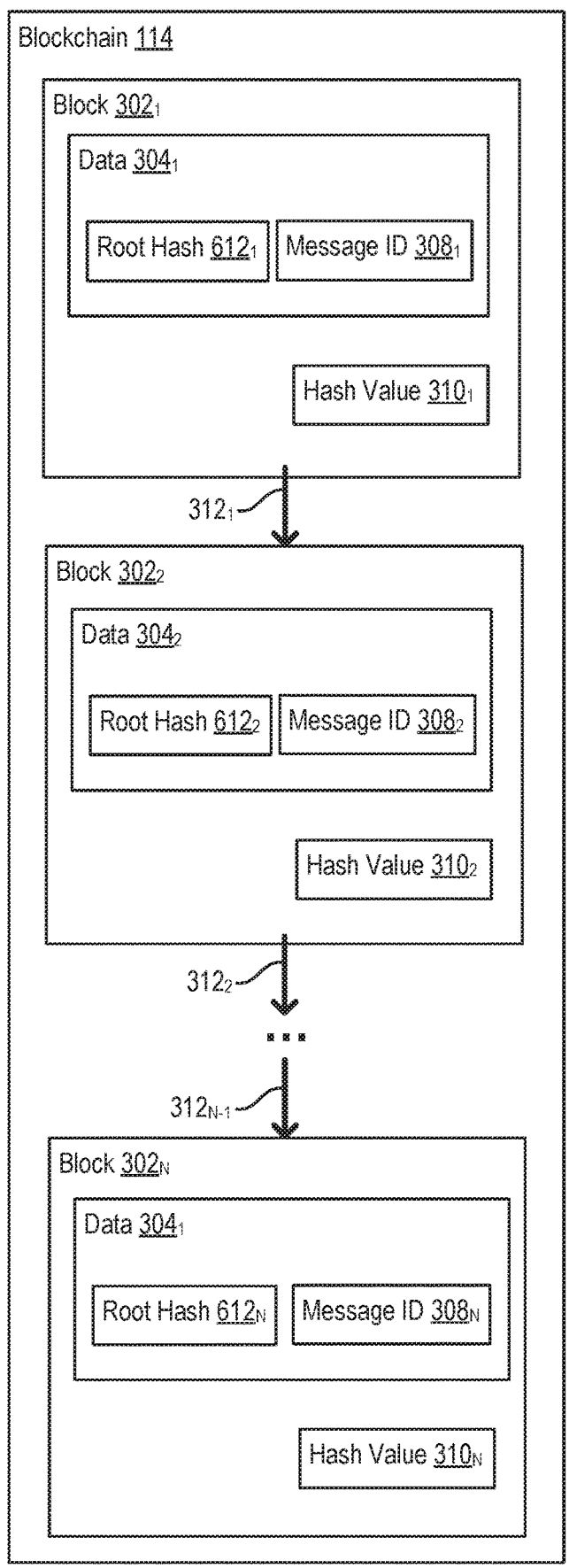
FIG. 3 depicts a block diagram of an exemplary distributed blockchain, according to an embodiment.

FIG. 3 depicts a block diagram of an exemplary distributed blockchain 114, according to an embodiment. Blockchain 114 is a distributed data structure, a copy of which is located at one or more locations throughout the computing system 100. As used herein, a "copy" of distributed blockchain 114 may be a full copy or a partial copy. The locations of copies of blockchain 114 may be, for example, memory or storage locations associated with controllers 106, multi-site controller 110, and/or servers 108. Each copy of blockchain 114 is synchronized with other copies within computing system 100 using a consensus mechanism, such as proof-of-work, proof-of-stake, proof-of-authority, or another mechanism. The consensus mechanism ensures that if a malicious entity tampers with one copy or a few copies of the blockchain 114, the tampered (modified by malicious entity) copies are discarded and the untampered (unmodified by malicious entity) copies are used by computing system 100 to authenticate messages between data centers 102.

The blockchain 114 is a data structure used for storage of data. The blockchain 114 comprises one or more data blocks 302 connected by pointers 312. Each block 302 comprises data 304, a hash value 310, and a pointer 312. The data 304 comprises a root hash 612 and, optionally, a message identifier 308. The root hash 612 and message identifier 308 are described in more detail below with reference to FIGS. 4 and 6.

The hash value 310 is an output of a hash function, such as secure hash algorithm (SHA)-3 or Keccak256. The hash value 310 of the first block (i.e., block $302_1$) of the blockchain 114 results from hashing input that comprises data $304_1$. The hash value 310 of all subsequent blocks (i.e., blocks $302_2$-$302_N$) results from hashing input that comprises data 304 as well as hash value 310 of the previous block. For example, the hash value $310_2$ is the output of a hash function, where the input of that hash function comprises data $304_2$ and hash value $310_1$. Because the input that results in hash value 310 comprises hash value 310 of the previous block, the structure of blockchain 114 can be authenticated and validated. If a malicious entity attempts to modify data 304 of any block 302 of blockchain 114, the modification will be noticed through a comparison of the hash value 310 of that block and a recalculation of hash value 310 using the same hash function and the same inputs as used for obtaining hash value 310 stored in that block. A copy of blockchain 114 containing an unauthorized modification is discarded through the blockchain consensus mechanism, and the copy is replaced by a copy without the unauthorized modification.

Each block 302 comprises a pointer 312, which may be an address within a memory or storage containing the copy of blockchain 114. The first block of the blockchain 114 (i.e., block $302_1$) contains the pointer $312_1$, which points to the location in storage or memory containing the next block of the blockchain 114 (i.e., block $302_2$). The last block of blockchain 114 (i.e., block $302_N$) has pointer 312 with a null value, or alternatively, does not have pointer 312.

Figure 4:
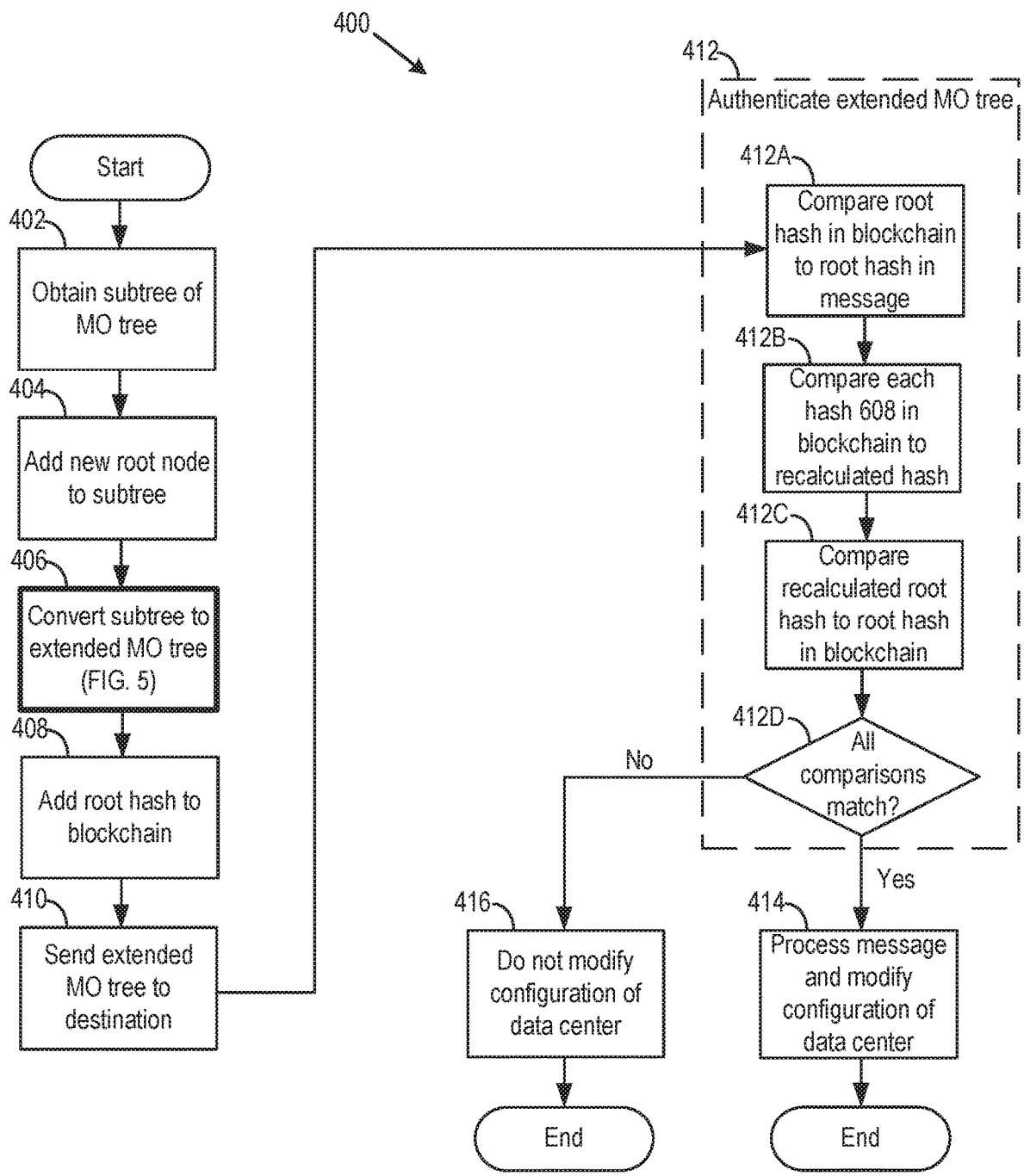
FIG. 4 depicts a flow diagram of a method of authenticating a message, according to an embodiment.

FIG. 4 depicts a flow diagram of a method 400 for authenticating a message, according to an embodiment. As used herein, a "message" may be a group of one or more network packets. For clarity, method 400 is discussed as performed largely by source site controller $106_1$ of data center $102_1$, but steps of method 400 may be performed by any of the site controllers 106, by the multi-site controller 110, or by a combination of the controllers 106/110. In one embodiment, the method 400 is triggered when a controller 106/110 determines that the information in the MO tree 116 should be sent to another data center 102, such as in response to a request for that information by another data center 102.

For the purpose of illustrating method 400, an example is used of sending a message from data center $102_1$ to data center $102_2$ over network 118. In the example, it is assumed that the tree shown in FIG. 2 is MO tree $116_1$, and that the subtree of MO tree $116_1$ to be transmitted comprises nodes $204_2$ and its children. That is, the subtree comprises nodes $204_2$, $204_4$, $204_5$, $204_6$, $204_7$ and $204_8$.

At step 402, the site controller $106_1$ accesses its MO tree $116_1$ and obtains a subtree of MO tree $116_1$ in order to transmit the subtree to a destination data center $102_2$. In an embodiment, site controller $106_1$ obtains the subtree by creating a copy of the subtree. If a request for information did not specify what subtree is requested, then as part of step 402, the site controller $106_1$ determines the subtree of its MO tree 116 that should be transmitted to destination data center $102_2$. Although step 402 identifies a subtree, in other examples, the site controller 106 may transmit the entire MO tree 116.

At step 404, the source site controller $106_1$ adds a new root node to the subtree obtained at step 402. The new root node includes a data object 606 (see FIG. 6), similar to the data object 206. The data object 606 contains data of the source data center $102_1$, such as an identifier of data center $102_1$. The identifier may be a public IP address of data center $102_1$. At step 406, the source site controller $106_1$ converts the modified subtree of step 404 into an extended MO tree. Step 406 is further explained with reference to FIG. 5 and FIG. 6.

Figure 5:
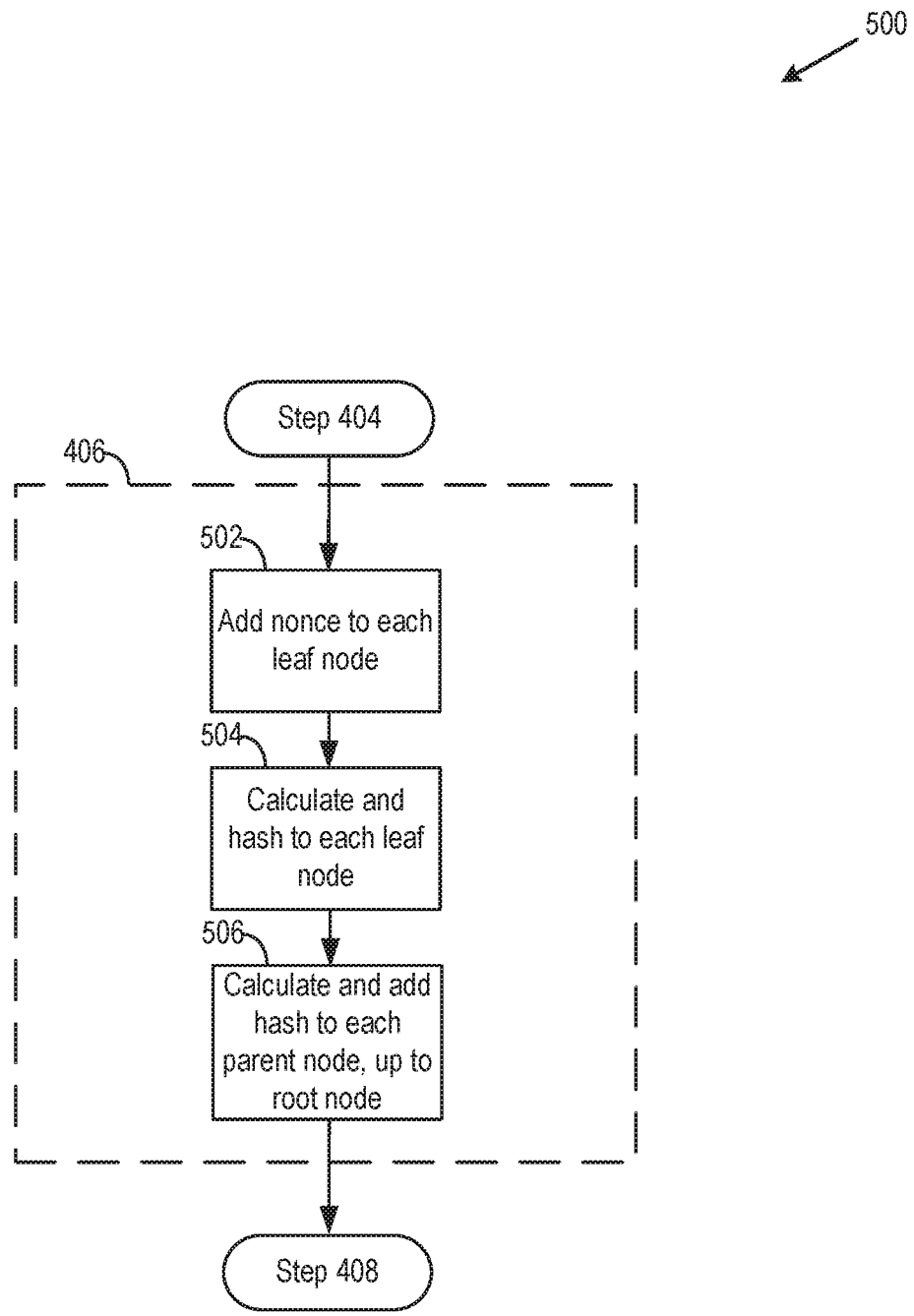
FIG. 5 depicts a flow diagram of a method of converting a tree to an extended management object tree, according to an embodiment.
Figure 6:
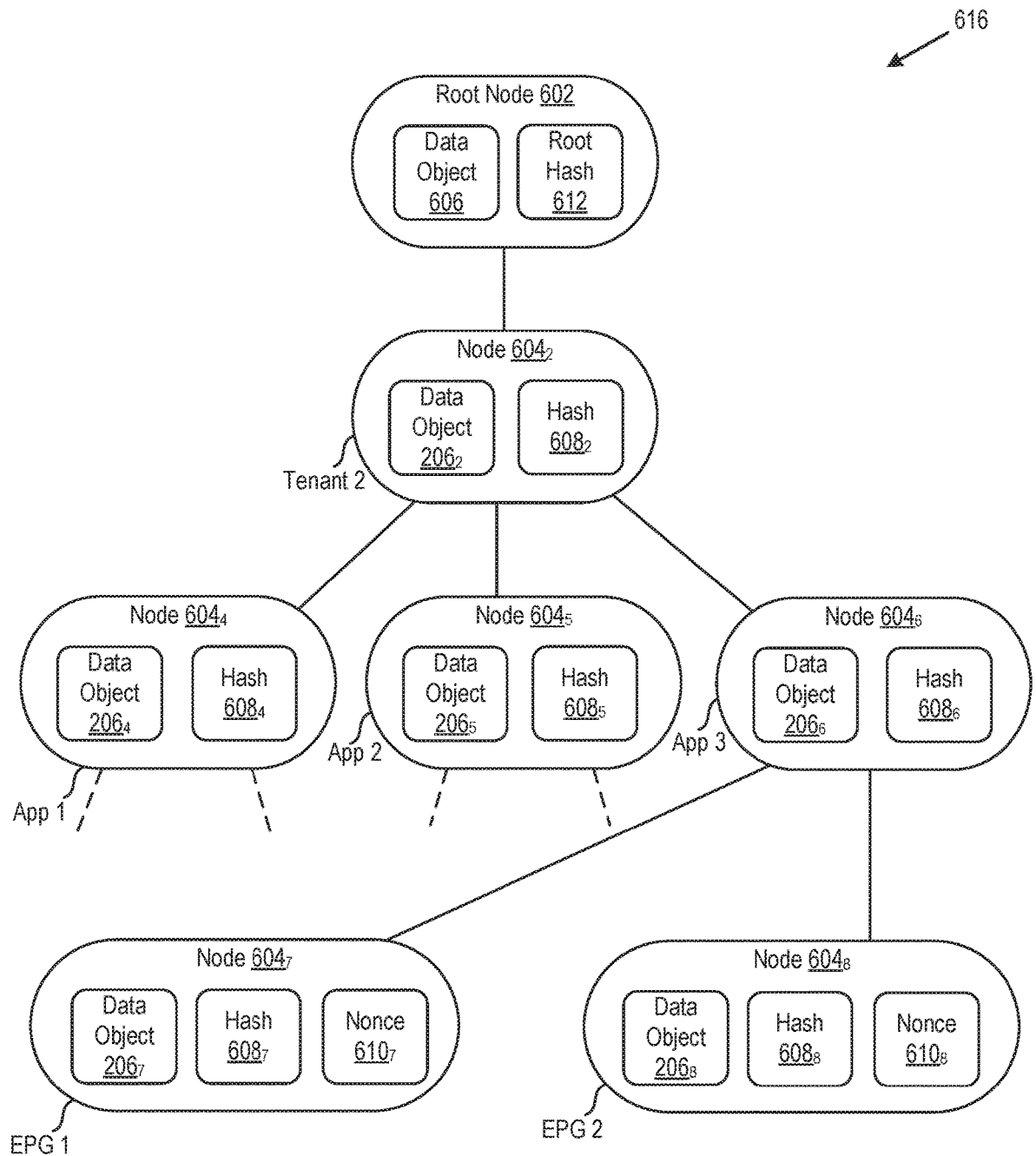
FIG. 6 depicts a block diagram of an exemplary extended management object tree, according to an embodiment.

FIG. 5 depicts a flow diagram of a method 500 of converting a tree to an extended MO tree, according to an embodiment. Method 500 is an expansion of step 406 of method 400. For the purpose of illustrating method 500, the subtree comprising nodes $204_2$, $204_4$, $204_5$, $204_6$, $204_7$ and $204_8$ of FIG. 2, as modified by adding a root node in step 404, is used as an exemplary tree that is converted to an extended MO tree. The end result of method 500, as applied to the exemplary tree, is shown in FIG. 6 as extended MO tree 616. FIG. 6 is referred to throughout the discussion of method 500.

FIG. 6 depicts a block diagram of an exemplary extended MO tree 616, according to an embodiment. Nodes $604_2$, $604_4$, $604_5$, $604_6$, $604_7$ and $604_8$ of extended MO tree 616 are modified nodes $204_2$, $204_4$, $204_5$, $204_6$, $204_7$ and $204_8$ of MO tree 116 of FIG. 2, respectively. The modifications are discussed with reference to the steps of method 500. For the purpose of discussing extended MO tree 616, it is assumed that nodes $604_4$ and $604_5$ have children (not shown), as indicated by the dashed lines branching from nodes $604_4$ and $604_5$.

At step 502, a nonce 610 is added to each leaf node of the tree of step 404 (see FIG. 6). Step 502 is optional. Following the above example, nonce 610 is added to node $204_7$ and node $204_8$, and to leaf nodes that branch from nodes $604_4$ and $604_5$ (these leaf nodes are not shown). The nonce 610 is a piece of data, such as a time stamp or a random number. Adding the nonce 610 to leaf nodes may prevent attacks, such as a replay attack (also known as playback attack), by a malicious entity. A replay attack is a form of a network attack in which a valid data transmission is maliciously or fraudulently repeated by an attacker. Adding the nonce 610 may also prevent a malicious entity from predicting hash values and figuring out what hash function is used, because without nonce 610, the same tree will always have the same hashes 612/608.

At step 504, the site controller $106_1$ calculates and adds a hash value 608 to each leaf node of the tree from step 502. The site controller $106_1$ adds hash 608 to leaf node $604_7$ and leaf node $604_8$, as well as to the leaf nodes that branch from the nodes $604_4$ and $604_5$ (these leaf nodes are not shown). The hash 608 of leaf nodes, such as leaf nodes $604_7$ and $604_8$, is calculated similarly to hash value 310 of FIG. 3. Hash 608 is an output of a hash function, such as SHA-3 or Keccak256. The hash 608 is the output that results from hashing input comprising data object 206 and nonce 610 of leaf node 604 to which hash 608 is added. Nonce 610 is included as an input to the hash function if the nonce 610 was added to leaf nodes in step 502. Continuing the above example, hash $608_7$ is an output of a hash function, where the input of the hash function is the nonce $610_7$ and the data object $206_7$. The hash $608_8$ is an output of the same hash function, where the input of the hash function is the nonce $610_8$ and data object $206_8$.

At step 506, the site controller $106_1$ calculates and adds hash 612/608 to each node 604 that is a parent of the leaf nodes, up to and including adding root hash 612 to root node

602. The hash 608 of parent nodes is calculated similarly to the hash 608 of leaf nodes. The hash 608 of parent nodes is the output of a hash function, where the input of the hash function includes the data object 206 of the node into which the hash 608 is added, and the input also includes all the hashes 608 of direct child nodes of the node into which hash 608 is added. Following the above example, the hash 608$_6$ is calculated by hashing the data object 206$_6$, hash 608$_7$, and hash 608$_8$, combined as a single input to the hash function. The hash 608$_2$ is an output of the hash function, the input being a combination of the data object 206$_2$, hash 608$_6$, hash 608$_5$, and hash 608$_4$. The root hash 612 is the output of the hash function, the input being data object 606 and hash 608$_2$. Root node 602 is the root node added at step 404, and modified by the addition of root hash 612. After step 506, method 500 continues to step 408 of method 400. At the completion of step 506, each node 604/602 comprises (e.g., stores) a hash value 608.

It should be noted that as used herein, an "extended MO" tree may be similar to a "hash" tree or a "Merkle" tree, as known in the art. Some Merkle tree implementations contain data and a hash of that data in leaf nodes, but parent nodes contain only hashes of hashes of direct child nodes, and no additional data other than hashes. In an extended MO tree described herein, each node may contain both data and a hash. However, method 400 of authenticating a message may be used with an extended MO tree having structure and contents that vary from that shown in FIG. 6. For example, MO tree 116 may be converted into an extended MO tree that has data objects 206 in leaf nodes only, along with metadata regarding the original structure of the tree. Parent nodes may have only hashes of hashes of child nodes, or may have hashes of hashes and contents of child nodes. The original tree structure, such as that shown in FIG. 2, may be reconstructed at the receiving destination by using the metadata. Such alternative hash tree structures may be used for and are compatible with message authentication described in FIG. 4.

Returning to FIG. 4, at step 408, the source site controller 106$_1$ or one of site controllers 106 adds the root hash 612 (see FIG. 6) to the distributed blockchain 114 which was calculated in step 506 of method 500. Site controller 106 adds the root hash 612 to the distributed blockchain 114 by adding a block to a copy of blockchain 114, the block containing root hash 612, as shown in FIG. 3. The newly added block is then synchronized on all copies of distributed blockchain 114 through the consensus mechanism of blockchain 114, as discussed above. As part of step 408, the site controller 106$_1$ places the extended MO tree 616 into a message composed of one or more network packets. Optionally, the site controller 106$_1$ adds a message identifier 308 to the distributed blockchain 114. Message identifier 308 may be an identifier that is a combination of an identifier of source data center 102$_1$ and an identifier of destination data center 102$_2$.

At step 410, the site controller 106$_1$ transmits the message to the site controller 106 of a destination data center 102. In an embodiment, the source site controller 106$_1$ transmits the message to the multi-site controller 110, which then transmits the message to the site controller 106 of the destination data center 102. Following the above example, source site controller 106$_1$ transmits the message to the destination site controller 106$_2$. Or alternatively, the site controller 106$_1$ transmits the message to the multi-site controller 110, which transmits the message to the site controller 106$_2$. In an embodiment, the message is transmitted without adding the MO tree 616 to the distributed blockchain 114.

At step 412, the destination site controller 106$_2$ receives the message of step 410 and proceeds to authenticate the extended MO tree 616 contained within the message. In one embodiment, authentication is performed by extracting root hash 612 from the distributed blockchain 114. The extracted root hash 612 should correspond to the message sent at step 410 which contains the extended MO tree 616 that is being authenticated. The correct root hash 612 may be extracted by, for example, using a message identifier 308 of the message transmitted at step 410 to extract root hash 612 of extended MO tree 616 that was added to the message transmitted at step 410.

At step 412A, the extracted root hash 612 of blockchain 114 is compared to the root hash 612 within the extended MO tree 616 of the received message.

At step 412B, the hash 608 of each node 604 of MO tree 616 is recalculated. The hash 608 is recalculated using the same function, inputs, and process as for the calculation of hash 608 at step 504 above. Each recalculated hash is compared to the hash 608 stored within the extended MO tree 616.

At step 412C, the root hash 612 of the extended MO tree 616 is recalculated using the same function, inputs, and process as for the calculation of extracted root hash 612, and the recalculated root hash is compared to extracted root hash 612.

At step 412D, destination site controller 106$_2$ determines (a) whether the extracted root hash 612 matches the root hash 612 within the extended MO tree 616 (i.e., the two are identical), as compared in step 412A, (b) whether each hash 608 of extended MO tree 616 matches recalculated hash 608, as performed and compared in step 412B, and (c) whether the recalculated root hash 612 matches the extracted root hash 612 (i.e., the two are identical), as performed and compared in step 412C. If so, then the received extended MO tree 616 is authenticated, and method 400 continues to step 414. If any comparison within the three steps does not match, then the received extended MO tree 616 is not authenticated, and method 400 continues to step 416. Although step 412D is shown as performed after both 412A and 412B, optionally, if the comparison in 412A does not match, then method 400 may proceed to step 416 directly from step 412A. Similarly, if any of the comparisons in step 412B do not match, the method 400 may proceed to step 416 directly from step 412B.

By authenticating the extended MO tree 616 contained within the received message, the destination site controller 106$_2$ authenticates the message. As part of step 412, the destination site controller 106$_2$ may convert the extended MO tree 616 back to a subtree of the MO tree 116$_1$ by removing all the nonces 610 and the hashes 608, as well as by removing the added root node 602. The destination site controller 106$_2$ may store the MO subtree by adding the subtree to its own MO tree 116$_2$. Alternatively, the destination site controller 106$_2$ may consume information within the extended MO tree 616 without converting the extended MO tree 616 and/or without adding the information of extended MO tree 616 to its own MO tree 116$_2$.

At step 414, the destination site controller 106$_2$ processes the received message and modifies configuration of the data center 102$_2$ using the information within the received extended MO tree 616. For example, if the received extended MO tree 616 contains information about a tenant, the destination site controller 106 may change a configuration of the network devices 104 to allow access to certain applications within data center 102$_2$, or to create a virtual private network (VPN) for that tenant. Destination site controller 106₂ may connect the VPN to the servers 108 specified by EPGs of applications associated with that tenant. After step 414, method 400 ends.

At step 416, destination site controller 1062 does not modify configuration of destination data center 1022. Step 416 is reached if any of the comparison at steps 412A, 412B, or 412C fail (do not match). After step 416, method 400 ends.

The techniques discussed herein may be used together with other authentication methods to ensure data integrity. It should be noted that for any process described herein, additional or fewer steps may be performed in similar or alternative orders, or in parallel, within the scope of the various embodiments described herein, consistent with the teachings herein, unless otherwise stated.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method of authenticating a message, the method comprising:
   obtaining a set of data objects, the data objects being organized in a first management object (MO) tree, wherein the first MO tree is a tree data structure comprising a plurality of nodes, each storing data but not hashes;
   converting the first MO tree to an extended MO tree by adding at least a root hash, the extended MO tree comprising at least two of the plurality of nodes from the first MO tree and the root hash stored in a root node of the extended MO tree, wherein each of the at least two of the plurality of nodes in the extended MO tree comprises a calculated stored hash value;
   adding the root hash to a distributed blockchain;
   transmitting the extended MO tree across a network to a destination data center; and
   authenticating the extended MO tree at the destination data center by comparing (a) the root hash contained within the distributed blockchain, and (b) a second hash, wherein the authenticating further comprises, for each of the at least two of the plurality of nodes:
   recalculating the calculated stored hash value; and
   comparing the recalculated hash value to the calculated stored hash value.

2. The method of claim 1, further comprising reconfiguring network devices of the destination data center using information from the set of data objects.

3. The method of claim 1, wherein the second hash is obtained by recalculating the root hash of the extended MO tree.

4. The method of claim 1, wherein the second hash is the root hash contained within the extended MO tree at a time when the extended MO tree is received at the destination data center.

5. The method of claim 1, further comprising, prior to the converting, adding a root node to the first MO tree, wherein the root node of the first MO tree is a parent for the at least two of the plurality of nodes.

6. The method of claim 1, wherein the converting the first MO tree to the extended MO tree comprises adding the calculated stored hash value to each of the at least two of the plurality of nodes, wherein one of the added hash values is the root hash.

7. The method of claim 6, wherein the converting the first MO tree to the extended MO tree comprises adding a nonce value to each leaf node of the extended MO tree.

8. The method of claim 1, further comprising storing the set of data objects within a second MO tree stored within the destination data center.

9. The method of claim 1, wherein the distributed blockchain is synchronized using a consensus mechanism, the consensus mechanism comprising a proof-of-authority, a proof-of-stake, or a proof-of-work mechanism.

10. A non-transitory computer readable medium comprising instructions to be executed in a processor of a computer system, the instructions when executed in the processor cause the computer system to carry out a method of authenticating a message, the method comprising:
    obtaining a set of data objects, the data objects being organized in a first management object (MO) tree, wherein the first MO tree is a tree data structure comprising a plurality of nodes, each storing data but not hashes;
    converting the first MO tree to an extended MO tree by adding at least a root hash, the extended MO tree comprising at least two of the plurality of nodes from the first MO tree and the root hash stored in a root node of the extended MO tree, wherein each of the at least two of the plurality of nodes from the first MO tree comprises a calculated stored hash value;
    adding the root hash to a distributed blockchain;
    transmitting the extended MO tree across a network to a destination data center; and
    authenticating the extended MO tree at the destination data center by comparing (a) the root hash contained within the distributed blockchain, and (b) a second hash, wherein the authenticating further comprises:
    recalculating the calculated stored hash value; and
    comparing the recalculated hash value to the calculated stored hash value.

11. The non-transitory computer readable medium of claim 10, the method further comprising reconfiguring network devices of the destination data center using information from the set of data objects.

12. The non-transitory computer readable medium of claim 10, wherein the second hash is obtained by recalculating the root hash of the extended MO tree.

13. The non-transitory computer readable medium of claim 10, wherein the second hash is the root hash contained within the extended MO tree at a time when the extended MO tree is received at the destination data center.

14. The non-transitory computer readable medium of claim 10, the method further comprising, prior to the converting, adding a root node to the first MO tree, wherein the root node of the first MO tree is a parent for the at least two of the plurality of nodes.

15. The non-transitory computer readable medium of claim 10, wherein the converting the first MO tree to the extended MO tree comprises adding the calculated stored hash value to each of the at least two of the plurality of nodes, wherein one of the added hash values is the root hash.

16. The non-transitory computer readable medium of claim 15, wherein the converting the first MO tree to the extended MO tree comprises adding a nonce value to each leaf node of the extended MO tree.

17. The non-transitory computer readable medium of claim 10, the method further comprising storing the set of data objects within a second MO tree stored within the destination data center.

18. A system comprising:
a first data center comprising a set of data objects;
a destination data center;
a network connecting the first data center and the destination data center;
a memory; and
a processor, wherein the processor is programmed to carry out a method of authenticating a message, the method comprising:
obtaining the set of data objects, the data objects being organized in a first management object (MO) tree, wherein the first MO tree is a tree data structure comprising a plurality of nodes, each storing data but not hashes;
converting the first MO tree to an extended MO tree by adding at least a root hash, the extended MO tree comprising at least two of the plurality of nodes from the first MO tree and the root hash stored in a root node of the extended MO tree, wherein each of the at least two of the plurality of nodes from the first MO tree comprises a calculated stored hash value;
adding the root hash to a distributed blockchain;
transmitting the extended MO tree across the network to the destination data center; and
authenticating the extended MO tree at the destination data center by comparing (a) the root hash contained within the distributed blockchain, and (b) a second hash, wherein the authenticating further comprises:
recalculating the calculated stored hash value; and
comparing the recalculated hash value to the calculated stored hash value.

* * * * *